June 13, 1939.   H. D. PEOPLES   2,162,636
GRILL FOR COOKING FOODSTUFF OVER CAMPFIRES
Filed June 3, 1938
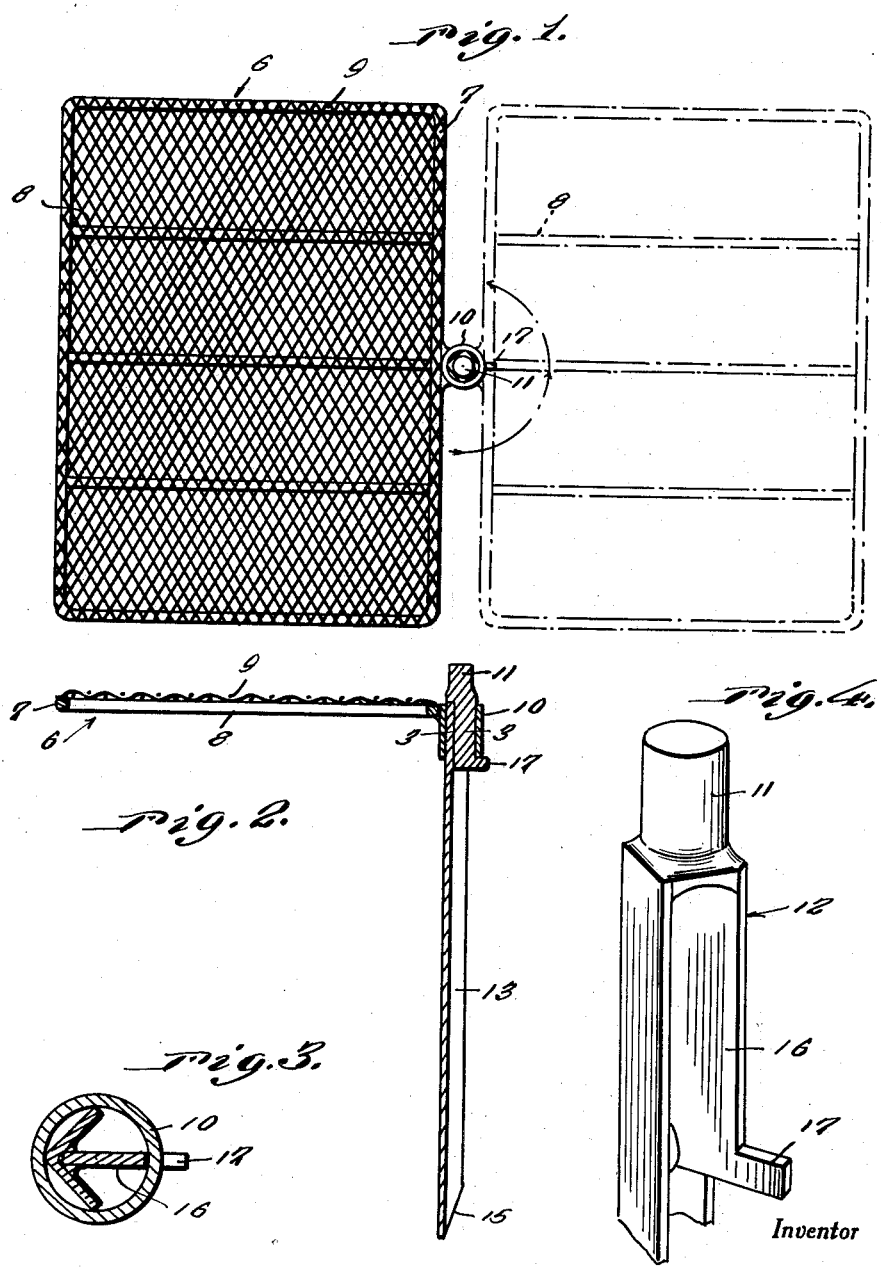
Inventor
H. D. Peoples
By Clarence A. O'Brien
and Hyman Berman
Attorneys Patented June 13, 1939

2,162,636

UNITED STATES PATENT OFFICE 2,162,636

GRILL FOR COOKING FOODSTUFF OVER CAMPFIRES

Harold D. Peoples, Canton, Ohio

Application June 3, 1938, Serial No. 211,657

2 Claims. (Cl. 248—121)

This invention relates to a grill for cooking foodstuff at camps, picnics and when on other outings and has for the primary object the provision of an efficient, portable and inexpensive device of this character which consists of a minimum number of parts easily taken apart to permit convenient carrying and storing thereof and may be readily set up adjacent a camp or picnic fire on which different kinds of meat and other foods may be placed and brought over the fire for broiling and other type of cooking and may be easily adjusted as close to the fire as desired for varying the cooking of the meat and other food, and which may be readily cleaned after use so that the device may be kept in a sanitary condition.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a grill constructed in accordance with my invention.

Figure 2 is a transverse sectional view showing the grill element mounted on a support.

Figure 3 is a sectional view taken on line 3—3 of Figure 2.

Figure 4 is a fragmentary perspective view showing a portion of the support.

Referring in detail to the drawing, the numeral 6 indicates a grill element, consisting of a substantially rectangular shaped metallic frame 7 having cross bars 8. A sheet of metallic foraminous material 9 is supported by the frame and is welded or otherwise secured thereon. The sheet of material 9 is prevented from sagging while under load by the cross bars 8.

A sleeve 10 is formed on one side of the frame substantially intermediate the ends of the latter and is removably mounted on a support 12.

The support 12 is in the form of a post 13 constructed of metallic angle iron material and has integral with its upper end a cylindrical shaped member 11 which may be employed as a strike face to permit the post to be driven into the ground with a hammer or ax. The other end of the post 13 is sharpened, as shown at 15, to facilitate the entrance of the post into the ground under hammer blows. Formed integrally with the post 13 is a plate 16, as shown in Figure 3, and cooperates with the angle iron portions of the post in forming a four-point bearing contact with the sleeve. The lower end of the plate carries an extension 17 for the sleeve 10 to engage and for limiting the downward movement of the sleeve on the post. Also the extension 17 may be employed as a strike face when desiring to drive the post out of the ground with the hammer or ax. The sleeve 10 is free to rotate on the post as shown in Figure 1.

In use, the post is driven into the ground adjacent the fire and the grill element is then applied to said post and positioned away from the fire so that meats and the like can be placed on the grill element without the necessity of the person coming too close to the fire. After the proper positioning of the meat on the grill element the latter is rotated about the post to assume a position directly over the fire so that the heat from the latter will grill the meat. The distance of the grill element from the fire can be governed by the distance which the post is driven into the ground. After the cooking of the meat or other foods on the grill element, the latter is swung laterally of the fire so that the meat and the like can be conveniently removed and served for eating. When the device is first set up adjacent the fire it may be preferable to swing the grill element over the fire prior to placing the meat or other food products thereon so that the grill element will be sterilized by the fire. After the use of the device for cooking purposes, the post can be easily driven out of the ground and the drill element removed from the post so that cleaning of the latter can be easily carried out. With the parts disassembled in a manner described, the device can be conveniently carried and stored in comparatively small space.

It is believed that the foregoing description, when taken in connection with the accompanying drawing will fully set forth the construction and advantages of this invention to those skilled in the art to which such a device relates, so that further detailed description will not be required.

Having thus described my invention, what I claim is:

1. A grill for campfires comprising a horizontally arranged grill element, a sleeve formed on said grill element, a supporting post adapted to be driven into the ground adjacent a fire and including walls integrally connected and coacting to form a V in cross section of the post, a plate formed on the post within the V thereof and cooperating with the walls of said post in forming a four-point bearing contact with the sleeve when the latter is positioned on said post, and an extension formed on said plate for limiting the downward movement of the sleeve on the post and for providing a strike face to permit driving of the post out of the ground.

2. A grill for campfires comprising a horizontally arranged grill element, a sleeve formed on said grill element, a supporting post adapted to be driven into the ground adjacent a fire and including walls integrally connected and coacting to form a V in cross section of the post, a plate formed on the post within the V thereof and cooperating with the walls of said post in forming a four-point bearing contact with the sleeve when the latter is positioned on said post, an extension formed on said plate for limiting the downward movement of the sleeve on the post and for providing a strike face to permit driving of the post out of the ground, and a solid cylindrical member formed integrally with one end of the post and providing strike face for driving the post into the ground and of an external diameter less than the internal diameter of the sleeve so that said sleeve may pass freely thereover when being applied and removed from the post.

HAROLD D. PEOPLES.